United States Patent Office 2,973,359
Patented Feb. 28, 1961

2,973,359
8-CHLOROLLOXAZINE-5,10-DIOXIDE

Harold G. Petering, Kalamazoo, Mich., assignor to The Upjohn Company, Kalamazoo, Mich., a corporation of Delaware No Drawing. Filed Sept. 10, 1959, Ser. No. 839,072

1 Claim. (Cl. 260—251.5)

This invention relates to a novel compound, namely, 8-chloroalloxyazine-5,10-dioxide, and to a process for the preparation thereof.

The novel compound of the invention has the structural formula:

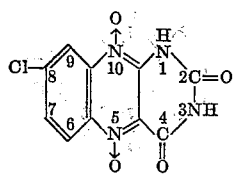

In the above structural formula, and throughout the specification, the Chemical Asbtracts system of numbering the alloxazine nucleus is adopted.

The novel compound of the invention exhibits marked diuretic activity. This activity is superior to that of the unoxidized compound, namely, 8-chloroalloxazine, from which the compound of the invention is derived by the process described hereafter. The marked difference in the diuretic activity of 8-chloroalloxazine and 8-chloroalloxazine-5,10-dioxide is illustrated by the results quoted in Table I. These results were obtained by administering the two compounds orally to rats in doses of 10, 20 and 40 milligrams per kilogram and measuring the volume of urine excreted during a period of 5 hours after administration of the drug. The results show the percentage increase in the excretion of urine by the treated rats compared with untreated control rats. Each figure represents the mean of results obtained in 7 animals. It will be seen that, at all dosage levels employed, the diuretic activity of 8-chloroalloxazine-5,10-dioxide was markedly superior to that of 8-chloroalloxazine.

TABLE I

| Oral Dose (mg./kg.) | Percent increase in urine excretion over controls | |
|---|---|---|
| | 8-chloroalloxazine | 8-chloroalloxazine-5, 10-dioxide |
| 10 | 3 | 60 |
| 20 | 28 | 127 |
| 40 | 51 | 149 |

The novel compound of the invention can be prepared in a convenient manner by oxidation of 8-chloroalloxazine using a peroxidizing agent such as hydrogen peroxide, peracetic acid, perbenzoic acid, perphthalic acid, benzoyl peroxide, persulfuric acid, permonosulfuric acid (Caro's acid), ozone, and the like. The reaction is advantageously carried out in an inert reaction medium, preferably a solvent such as formic acid, aqueous acetic acid, aqueous ethanol, aqueous methanol, aqueous isopropanol, or other aqueous or absolute lower alkanol, water, mixtures of lower alkanols, and the like solvents. The amount of peroxidizing agent used is at least twice the molar proportion with respect to the 8-chloroalloxazine and is preferably in excess of this amount. Advantageously the proportion of peroxidizing agent employed is within the range of about 2 moles to about 20 moles per mole of 8-chloroalloxazine. The reaction can be effected at any temperature within the range of about 15° C. to about 100° C. depending on the boiling point of the solvent or solvents employed in the reaction medium. Advantageously the reaction is carried out at a temperature within the range of about 65° C. to about 95° C.

The 8-chloroalloxazine-5,10-dioxide can be isolated from the reaction mixture by conventional procedures. In general, the desired product will separate spontaneously from the reaction mixture as a precipitate and can be isolated by filtration or by centrifugation. If desired, the product so isolated can be purified, for example, by recrystallization from a suitable solvent such as formic acid, methyl Cellosolve, Cellosolve, diethylene glycol and the ike.

The 8-chloroalloxazine, which is employed as starting material in the above process, can be prepared in a convenient manner by the reaction of substantially equimolar amounts of alloxan and 4-chloro-1,2-phenylenediamine in the presence of acetic acid and at least 0.03 mole, and preferably about 1.0 mole, of boric acid based on the amount of alloxan present in the reaction mixture. The reaction of alloxan and 4-chloro-1,2-phenylenediamine is capable of yielding a mixture of the desired 8-chloroalloxazine and a number of impurities, the chief of which is 6-chloro-1,2-dihydro-2-keto-3-carboxyquinoxaline ureide. The proportion of the desired 8-chloroalloxazine present in the reaction product varies with the reaction conditions employed. Using the above-described reaction conditions the reaction product is 8-chloroalloxazine substantially free from impurities.

The novel compound of the invention, when employed for therapeutic purposes, can be combined with solid or liquid pharmaceutical carriers and formulated as tablets, powder packs, or capsules using starch and like excipients, or dissolved or suspended in suitable solvents or vehicles, for oral or parenteral administration.

The following example is illustrative of the process and product of the present invention, but is not to be construed as limiting.

EXAMPLE
8-chloroalloxazine-5,10-dioxide (A) PREPARATION OF 8-CHLOROALLOXAZINE A portion of 500 ml. of Raney nickel catalyst was washed by slurrying with three portions, each of 500 ml., of absolute alcohol, followed by three portions, each of 500 ml., of ethyl acetate. The solvent washings were discarded. The washed catalyst was transferred, as a slurry in ethyl acetate, to a 5 gallon autoclave, and ethyl acetate was added to make the total volume 11,250 ml. To the catalyst suspension was added 750 g. (4.4 moles) of 4-chloro-2-nitroaniline [Ind. Eng. Chem., 22, 547 (1930)]. The autoclave was sealed, flushed with nitrogen and with hydrogen under pressure and then agitated at room temperature under a pressure of 50 p.s.i. of hydrogen. The reaction was exothermic and the agitation was interrupted periodically to control the temperature which was maintained at 25 to 30° C. throughout. After the reaction was known to be under control (about 10 minutes), the agitation was continued for a further hour. The autoclave was then vented and flushed three times with nitrogen under a pressure of 50 p.s.i. The contents of the autoclave were removed and filtered and the autoclave and catalyst were washed with 3 l. of ethyl acetate. The combined filtrate and washings were evaporated at 45 to 55° C. under reduced pressure. There was thus obtained 600 g. (95.6% yield) of 4-chloro-1,2-phenylenediamine in the form of a colorless crystalline solid. To a solution of 600 g. (4.2 moles) of the compound so obtained, in 7.8 l. of glacial acetic acid was added 354 g. (5.72 moles) of powdered boric acid and 710 g. (4.43 moles) of powdered alloxan monohydrate, the solids being rinsed into the reaction vessel with 4.5 l. of glacial acetic acid. The reaction mixture was stirred and maintained at room temperature (approximately 20° C.) for a period of 3 days. The solid which had separated was isolated by filtration, the reaction vessel being rinsed with approximately 2 l. of glacial acetic acid. The precipitate was sucked as dry as possible on the filter, washed with 3.785 l. of Skellysolve B (a mixture of hexanes) and suspended in 11.5 l. of deionized water. The suspension was stirred and heated on a steam bath for 2 hr. before being cooled to room temperature and filtered. The precipitate was sucked as dry as possible on the filter and was suspended in 11.5 l. of absolute alcohol. The suspension was stirred and heated to the boiling point on a steam bath. The mixture was cooled to room temperature and filtered. The precipitate was sucked as dry as possible on the filter and then dried to constant weight at 60° C. under reduced pressure. There was thus obtained 990 g. (86.0% yield based on 4-chloro-1,2-phenylenediamine) of 8-chloroalloxazine in the form of a solid having a melting point of 329 to 331° C.

*Analysis.*—Calcd. for $C_{10}H_5ClN_4O_2$: C, 48.30; H, 2.03; Cl, 14.26; N, 22.54. Found: C, 48.20; H, 2.29; Cl, 14.65; N, 22.54.

(B) PREPARATION OF 8-CHLOROALLOXAZINE-5,10-DIOXIDE

To a mixture of 2.5 g. (0.01 mole) of 8-chloroalloxazine, prepared as described above, in 100 ml. of 88% aqueous formic acid, was added 10 ml. (0.1 mole) of 30% (by volume) aqueous hydrogen peroxide. The mixture was heated to 65° C. on the steam bath and the temperature was allowed to rise to 95° C. during which time there was rapid evolution of gas and all of the solid went into solution. The color changed from pale yellow to deep orange. After two hours, the mixture was cooled and allowed to stand at approximately 0° C. for 3 days. The crystalline solid which had separated was isolated by filtration, washed successively with water, alcohol and acetone, and dried. There was thus obtained 2.4 g. of 8-chloroalloxazine-5,10-dioxide in the form of a crystalline solid having a melting point of 293 to 294° C.

*Analysis.*—Calcd. for $C_{10}H_5ClN_4O_4$: C, 42.8; H, 1.79; N, 19.95; O, 22.8; Cl, 12.65. Found: C, 43.37; H, 2.40; N, 19.72; O, 23.70; Cl, 11.73.

I claim:
8-chloroalloxazine-5,10-dioxide having the following structural formula:

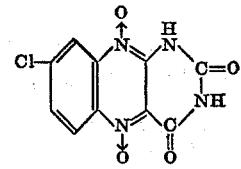

References Cited in the file of this patent

Simpson: The Chemistry of Heterocyclic Compounds, Condensed Pridazine and Pyrazine Rings (Interscience Publishers, 1953), p. 232.